(12) United States Patent
Orr et al.

(10) Patent No.: US 6,567,127 B1
(45) Date of Patent: May 20, 2003

(54) METHOD AND APPARATUS FOR ENHANCED VIDEO ENCODING

(75) Inventors: Stephen J. Orr, Markham (CA); Stefan Eckart, Mountain View, CA (US); Miachel L. Lightstone, Fremont, CA (US)

(73) Assignee: ATI International SRL, Barbados (KN)

( * ) Notice: Subject to any disclaimer, the term of this patent is extended or adjusted under 35 U.S.C. 154(b) by 0 days.

(21) Appl. No.: 09/416,019

(22) Filed: Oct. 8, 1999

(51) Int. Cl.[7] ............................................... H04N 7/088
(52) U.S. Cl. ......................................... 348/478; 386/94
(58) Field of Search ........................... 348/478; 386/94; 725/25, 27, 28, 136

(56) References Cited

U.S. PATENT DOCUMENTS

| | | | |
|---|---|---|---|
| 5,844,615 A | * 12/1998 | Nuber et al. | 348/423 |
| 6,278,733 B1 | * 8/2001 | Bennett et al. | 375/240 |
| 6,356,704 B1 | * 3/2002 | Callway et al. | 386/94 |
| 2002/0034252 A1 | * 3/2002 | Owen et al. | 375/240.17 |

FOREIGN PATENT DOCUMENTS

| | | |
|---|---|---|
| EP | 0 574 892 A2 | 12/1993 |
| EP | 0580 367 A2 | 1/1994 |
| EP | 0581 227 A2 | 2/1994 |
| EP | 0854 648 A2 | 7/1998 |
| WO | WO95/15660 | 6/1995 |

OTHER PUBLICATIONS

European Search Report for EP 00 307709.6–2202 dated Jun. 14, 2002.
Annex to the European Search Report for EP 00 307709.6–2202.

* cited by examiner

Primary Examiner—Chris Kelley
Assistant Examiner—George A Bugg, Jr.
(74) Attorney, Agent, or Firm—Vedder, Price, Kaufman & Kammholz

(57) ABSTRACT

A method and apparatus for video compression that provides support for the inclusion of VBI data and copy protection data in an enhanced encoded video data stream is presented. A received video signal is separated such that a video data stream and a VBI data stream are produced. The video data stream is encoded to produce a compressed video data stream. The various types of VBI data that may be included in the VBI data stream are isolated, and one or more are selected for inclusion in the enhanced video data stream. The compressed video data stream is then combined with the one or more VBI data type streams to produce the enhanced video data stream. In other embodiments, copy protection information in the video signal is also detected and encoded such that it also can be included in the enhanced video data stream. The enhanced video data stream can be stored in memory or some other type of storage media for retrieval at a later time. Once retrieved from the memory, the various types of data within the enhanced video data stream are separated out and provided to decoding blocks such that the video signal encoded can be reproduced in its entirety.

24 Claims, 4 Drawing Sheets

METHOD AND APPARATUS FOR ENHANCED VIDEO ENCODING

FIELD OF THE INVENTION

The invention relates generally to video data processing and more particularly to a method and apparatus for enhanced encoding of video signals.

BACKGROUND OF THE INVENTION

Encoding analog video signals in digital format has presented a new array of features for users. One such feature is the ability to record large amounts of the digital video stream in a reasonable amount of digital storage space such that the capabilities of a traditional videocassette recorder (VCR) can be realized on a home computer. Such an application is often referred to as a digital VCR, digital video recorder (DVR), or personal video recorder (PVR). In operation, these systems typically encode the video data into an MPEG format prior to storage in the storage media, as the MPEG format provides some level of compression of the video information.

A drawback of these systems is that any information included in the vertical blanking interval (VBI) is not preserved through the encoding process. The VBI is a portion of the analog video signal corresponding to the time during which portion of the screen that is being drawn to returns from the bottom of the screen to the top. No video display information is required during this time interval, and it is often employed to carry additional data related to the video signal such as closed caption data, parental control information, etc. Because the encoding process does not preserve VBI data, closed caption and other VBI data included in the video data stream is lost and cannot be recovered from the stored encoded video stream.

Another limitation of digital VCRs, or other systems that store portions of video data streams for later use is the lack of support for copy protection standards. Typically, when the video stream is encoded, any copy protection information included in the video data stream is lost. Thus, if a user is able to store the video data stream in an encoded format on a storage media and retrieve it later for use, the copy protection included in the original video signal has effectively been defeated.

Therefore, a need exists for a method and apparatus for encoding a video data stream that supports information included in the vertical blanking interval and also supports copy protection that may be included in the received video signal such that unauthorized use of the signal is not possible.

DETAILED DESCRIPTION OF A PREFERRED EMBODIMENT OF THE INVENTION

Generally, the present invention provides a method and apparatus for video compression that provides support for the inclusion of VBI data and copy protection data in an enhanced encoded video data stream. A received video signal is separated such that a video data stream and a VBI data stream are produced. The video data stream is encoded to produce a compressed video data stream. The various types of VBI data that may be included in the VBI data stream are isolated, and one or more are selected for inclusion in the enhanced video data stream. The compressed video data stream is then combined with the one or more VBI data type streams to produce the enhanced video data stream. In other embodiments, copy protection information in the video signal is also detected and encoded such that it also can be included in the enhanced video data stream. The enhanced video data stream can be stored in memory or some other type of storage media for retrieval at a later time. Once retrieved from the memory, the various types of data within the enhanced video data stream are separated out and provided to decoding blocks such that the video signal encoded can be reproduced in its entirety.

Figure 1:
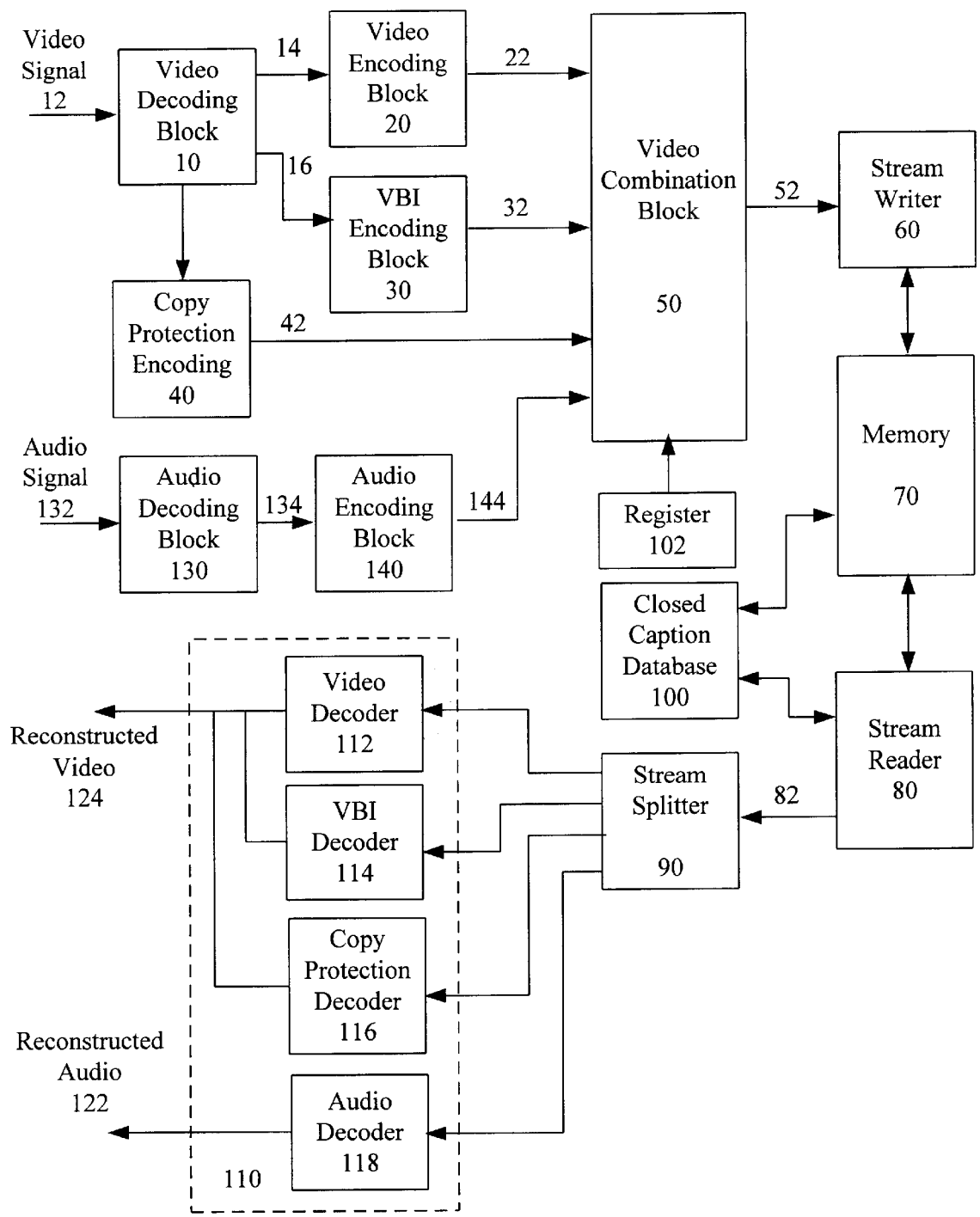
FIG. 1 illustrates a block diagram of a video circuit that utilizes an enhanced encoded video data stream in accordance with the present invention.

The invention can be better understood with reference to FIGS. 1–4. FIG. 1 illustrates a block diagram of a video compression circuit that is shown to also include a means for storing the resulting enhanced video data stream and retrieving it for use. The circuit includes a video decoding block 10 that receives a video signal 12. The video decoding block separates a video data stream 14 from any VBI data that is present in the video signal 12. The VBI data is parsed to produce a VBI data stream 16. The video signal 12 may be received in an analog format, thus requiring the video decoding block 10 to also perform the step of digitization of the video signal 12 prior to separation into the video and VBI data streams 14 and 16.

Various types of information may be included in the VBI data stream 16. These types of information may include closed caption information, parental control information, various information types as determined by the advanced television enhancement form (ATEF), Teletext information, and Intercast information. Note that additional data types may be included in the VBI data stream 16, and the aforementioned list is merely illustrative of some examples. The VBI encoding block 30 isolates a selected VBI data type from the VBI data stream 16 to produce a selected VBI data type stream. Note that the VBI decoding block may isolate a plurality of VBI data types from the VBI data stream 16 to produce a plurality of VBI data type streams, or it may isolate a plurality of data types to produce a single combined VBI data type stream that includes all of the VBI data type information included in the video signal 12. The one or more selected VBI data type streams 32 are provided to the video combination block 50.

The video combination block 50 receives the one or more selected VBI data type streams 32 from the VBI encoding block 30, and also receives a compressed video data stream 22 provided by the video encoding block 20. The video encoding block 20 encodes the video data stream 14 to produce the compressed video data stream 22. In one embodiment, the video encoding block 20 encodes the video data stream 14 based on an MPEG compression standard. The MPEG compression standard includes a number of versions, or revisions, and as would be apparent to one of ordinary skill in the art, any of the MPEG versions that supports the required functionality of the system described is suitable for use. For example, the MPEG-2 standard is known to provide the required capabilities to support the teachings of the invention described herein.

The video combination block 50 combines the compressed video data stream 22 and the one or more selected VBI data type streams 32 to produce an enhanced video data stream 52. In the case where the video encoding block 20 utilizes an MPEG standard encoding scheme, the VBI data may be multiplexed into the enhanced video data stream utilizing the custom data type (private stream) included in the MPEG standard. Usage of the custom data type for transporting additional data in an MPEG data stream is known in the art.

A register 102 coupled to the video combination block 50 may be used to control the inclusion of the various VBI data types in the enhanced video data stream 52. Thus, the register 102 may provide a means for selecting certain VBI data types from the one or more VBI data type streams 32 provided to the video combination block 50. For example, in some instances it may be beneficial to limit the inclusion of various VBI data types based on their likelihood of usage. The register 102 may also be user programmable such that support for various VBI data types is controlled.

In order to allow the inclusion of audio data and the enhanced video data stream, the circuit of FIG. 1 may also include an audio decoding block 130 and an audio encoding block 140. The audio decoding block 130 receives an audio signal 132 and digitizes the audio signal 132 when it is in an analog format to produce a digital audio signal 134. The audio encoding block 140 encodes the digital audio signal 134 to produce an encoded audio stream 144 which is provided to the video combination block 150. The video combination block then includes the encoded audio stream in the enhanced video stream.

The circuit of FIG. 1 may also provide support for copy protection information that may be included in the video signal 12. The video decoding block 10, upon receipt of the video signal 12, detects any copy protection information included in the video signal. Based on this detection, a copy protection encoding block 40 may encode the copy protection information to produce an encoded copy protection indication 42. The encoded copy protection indication 42 may be a simple message that indicates a certain type of copy protection that is included in the video signal 12, or it may be an ongoing data stream, where both types of encoding may allow for recreation of the copy protection information in a reconstructed video signal. The encoded copy protection indication 42 is provided to the video combination block 50 where it is multiplexed into the enhanced video data stream. As was the case with the VBI data type streams, the encoded copy protection indication 42 may be included in the enhanced video data stream 52 utilizing the custom data type included in the MPEG standard. The multiplexing of the encoded copy protection indication into the enhanced video data stream may also be controlled by the register 102.

Note that the inclusion of copy protection information in the enhanced video data stream 52 may be exclusive of the inclusion of VBI data types in the enhanced video data stream 52, and vice versa. Thus, inclusion of either VBI data types or copy protection information in the enhanced data stream is possible, and systems can be specifically designed to only include the circuitry required to support the inclusion of one or the other. The embodiment illustrated in FIG. 1 allows for the inclusion of both copy protection indications and VBI data type streams in the enhanced video data stream 52.

Once the enhanced video data stream 52 has been generated, a stream writer 60 may be included in the circuit such that the enhanced video data stream 52 can be stored in a memory device 70. The memory device 70 may be any type of storage media that is used to store digital information. Examples include hard disks, random access memory, floppy disks, and the like.

A stream reader 80 that is coupled to the memory 70 retrieves at least a portion of the enhanced video data stream from the memory 70 to produce a retrieved enhanced video data stream 82. The stream reader 80 may retrieve the entire enhanced video data stream from the memory 70, or it may retrieve particular portions of the enhanced video data stream based on a closed caption database 100 included in the system. The closed caption database 100 preferably stores time stamped closed caption information that was included in the video signal 12. The closed caption database 100 can be searched to find a particular reference included in the closed caption data stream, and the time stamp associated with that reference can then be used to reference a particular portion of the enhanced video data stream stored in the memory 70.

Note that the storage of the enhanced video data stream 52 in the memory 70 may be performed using a standard encoding format, such as the MPEG format, or in the case where copy protection is important, a non-standard format may be utilized. The importance of using a non-standard format when copy protection is important is apparent in the fact that if the data is stored in the memory in a standard format, various stream readers could be used to retrieve the data from memory, thus effectively defeating the copy protection. Therefore, it is important that when the enhanced video data stream 52 is stored in the memory in a non-standard (proprietary) format, the stream reader that is utilized to retrieve the enhanced video data stream from the memory 70 is a qualified, or authenticated stream reader 80.

A stream splitter 90 receives the retrieved enhanced video data stream 82 from the stream reader 80 and divides, or separates, the enhanced video data stream into its component portions. These component portions are then provided to various blocks included in a reconstruction block 110 such that a reconstructed video signal 124 and a reconstructed audio signal 122 can be generated. As is illustrated, the reconstruction block 110 preferably includes a video decoder 112, a VBI decoding block 114, a copy protection recreation block (decoder) 116, and an audio decode block 118. The output of the video decoder 112, the VBI decoder 114, and the copy protection recreation block 116 are combined to produce the reconstructed video signal 124.

Thus, the capabilities of some video encoding techniques to encapsulate VBI data and copy protection data allows for the generation of an enhanced video data stream. The enhanced video data stream carries the VBI and copy protection information as it progresses through the system, such that when the video signal is recreated, the VBI information and/or the copy protection information can be included in the reconstructed video signal.

Figure 2:
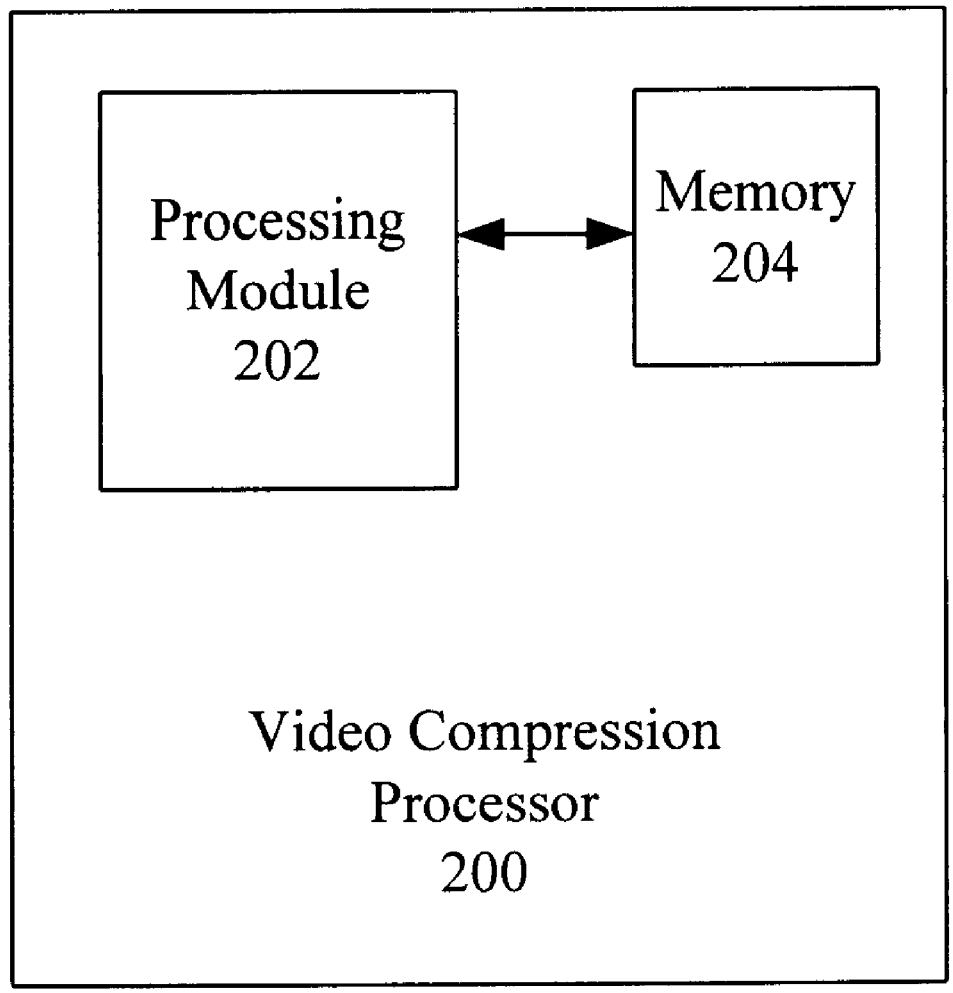
FIG. 2 illustrates a block diagram of a video compression processor in accordance with the present invention.

FIG. 2 illustrates a block diagram of a video compression processor that may be included in a system such as a set top box, a personal computer, or another device that can receive a video signal and store it prior to display. The video compression processor 200 includes a processing module 202 and memory 204. The processing module 202 may include a single processing entity or a plurality of processing entities. Such a processing entity may be a microprocessor, microcontroller, digital signal processor, state machine, logic circuitry, and/or any device that processes information based on operational and/or programming instructions. The memory 204 may be a single memory device or a plurality of memory devices. Such a memory device may be a read only memory device, random access memory device, floppy disk, hard drive memory, and/or any device that stores digital information. Note that when the processing module 202 has one or more of its functions performed by a state machine and/or logic circuitry, the memory containing the corresponding operational instructions is embedded within the state machine and/or logic circuitry.

Figure 3:
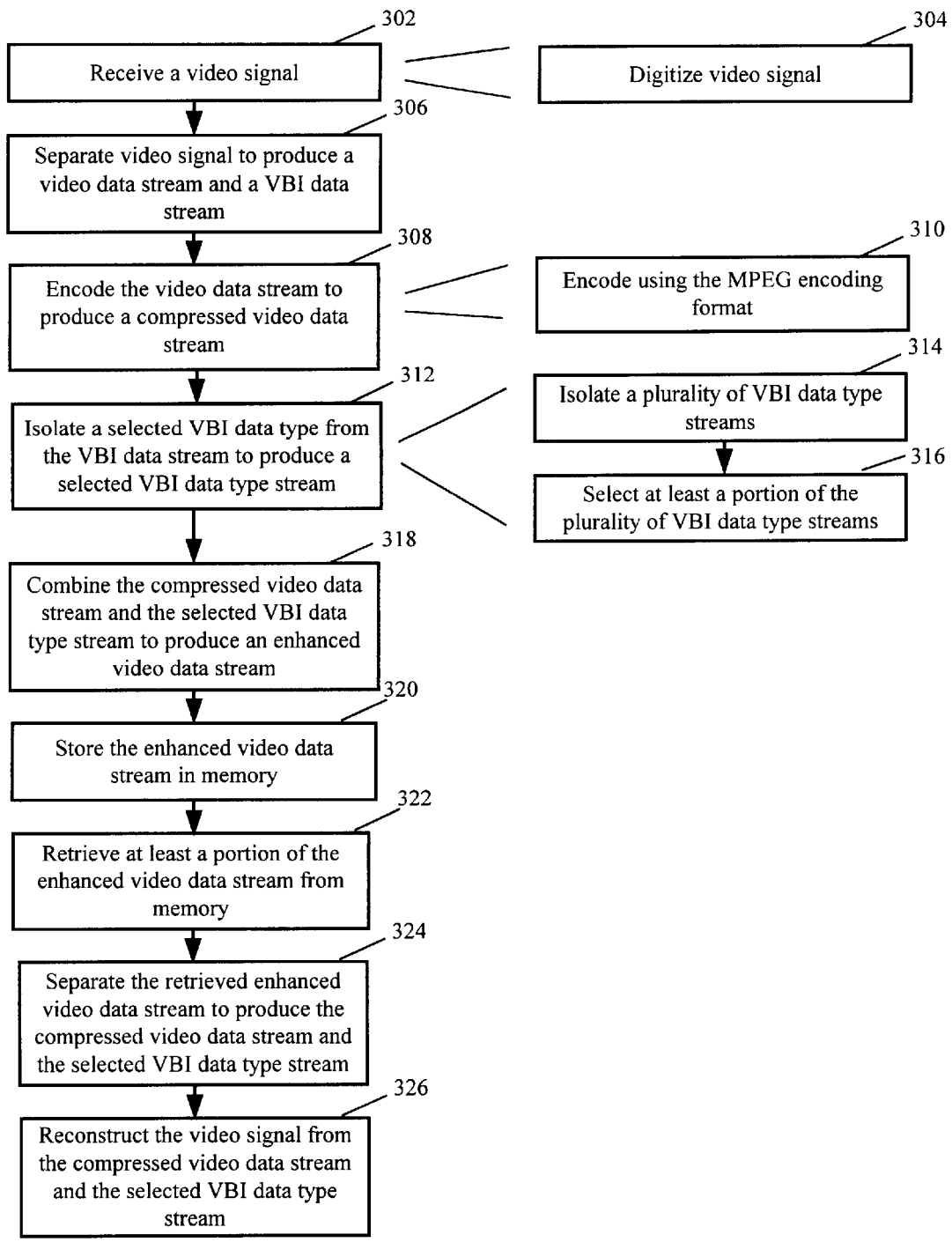
FIG. 3 illustrates a flow diagram of a method for video compression in accordance with the present invention.
Figure 4:
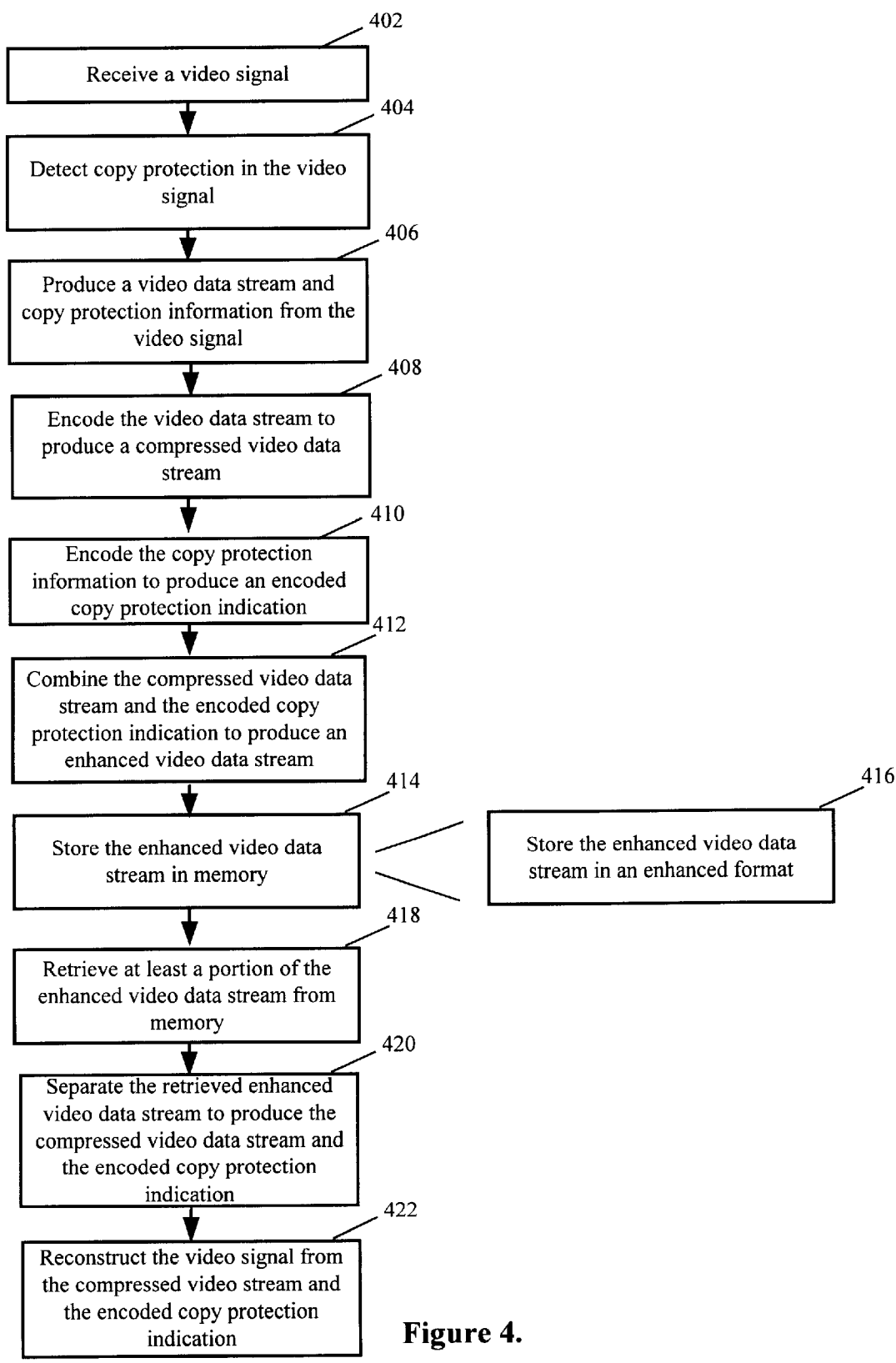
FIG. 4 illustrates a flow diagram of an alternate method for video compression in accordance with the present invention.

The memory 204 stores programming and/or operational instructions that allow the processing module 202 to perform the methods, or portions of the methods, illustrated in FIGS. 3 and 4. Note that portions of the methods of FIGS. 3 and 4 may be performed by additional circuitry that interacts with the video compression processor 200, such as a video decoding block as described earlier. Thus, a mixture of hardware and software may be employed to execute the methods of FIGS. 3 and 4.

FIG. 3 illustrates a method for video compression that begins at step 302 where a video signal is received. The video signal may be received in an analog or digital format, and in the case of an analog format video signal, the signal is digitized at step 304 prior to further processing. At step 306, VBI data is separated from video data in the video signal to produce a video data stream and a VBI data stream.

At step 308, the video data stream is encoded to produce a compressed video data stream. In one embodiment, the encoding performed at step 308 is performed as illustrated in step 310 such as the encoding is an MPEG format in coding, wherein the MPEG format may include any appropriate MPEG version (e.g. MPEG-2). In other embodiments, other forms of video encoding may be employed.

At step 312, at least one selected VBI data type is isolated from the VBI data stream to produce at least one selected VBI data type stream. In one embodiment, a single VBI data type may be isolated, whereas in other embodiments, steps 314 and 316 may isolate a plurality of VBI data types and then select at least a portion of that plurality for further processing.

At step 318, the compressed video data stream is combined with one or more of the selected VBI data type streams to produce an enhanced video data stream. As was stated earlier, in the case where the compressed video data stream is an MPEG video data stream, the custom data type that exists within the MPEG standard can be employed to multiplex the VBI data into the enhanced video data stream. Note that the combination performed at step 318 may further include selecting certain VBI data types prior to performing the combination such that only certain types of VBI data are included in the enhanced video data stream.

The combination performed at step 318 may also combine an encoded audio stream with the video and VBI data streams. Such an encoded audio stream may be derived from a received audio signal that has been digitized and then encoded. In addition, the combination performed at step 318 may also include the combination of copy protection information included in the video signal as originally received. The isolation and encoding of such copy protection information was described earlier, and is also detailed further in FIG. 4.

At step 320, the enhanced video data stream is stored in memory. As stated earlier, the memory used may include any type of storage media suitable for storing the amount of data required to satisfy the needs of the enhanced video data stream. In a typical computer application, this may include hard drive storage media.

At step 322, at least a portion of the enhanced video data stream is retrieved from the memory. The retrieval of the portion of the enhanced video data stream from memory may be a continuous retrieval that basically reads the data stream from the memory as it was written, or may be a more selective retrieval. A more selective retrieval technique may be based on a stored closed caption database that includes time-stamped closed caption information that can be utilized to selectively access various portions of the enhanced video data stream. For example, if a user wanted to view certain portions of the enhanced video data stream around which a particular word was used, the closed caption database could be searched for references to that particular word and then the time-stamp information utilized to selectively access the enhanced video data stream in memory.

At step 324, the retrieved enhanced video data stream is separated to produce the compressed video data stream and the selected VBI data stream. Thus, the components that were combined at step 318 are separated at step 324. Finally, at step 326, a reconstructed video signal is produced from the components separated at step 324. The resulting reconstructed video signal includes the video data stream, and may also include any copy protection information or VBI data included in the original video signal, as well as any audio information that was included in the enhanced video data stream at step 318. Such a method enables users to use the digital VCR and other time shifting capabilities of video processors to view programs, while still taking advantage of the functionality included in the various types of VBI data streams. Additionally, any copy protection that was included in the original video signal is maintained.

FIG. 4 illustrates a method that highlights the inclusion of copy protection information in the enhanced video data stream. Note that as was described with respect to FIG. 3, both VBI data and copy protection information may be included in the enhanced data stream. However, in some embodiments, only copy protection information or only VBI data may be included. The method of FIG. 4 begins at step 402 where a video signal is received. At step 404, copy protection is detected in the video signal. At step 406, a video data stream and copy protection information is produced from the video signal. This production may involve separating the copy protection information from the video signal, or the device receiving the video signal may simply bypass the copy protection information to generate the video data stream, while maintaining a record of the type of copy protection detected such that the copy protection information that identifies the style and type of copy protection can be generated.

At step 408, the video data stream is encoded to produce a compressed video data stream. As was the case with step 308 of FIG. 3, the encoding performed at step 408 may be MPEG encoding, or any other type of video encoding that will support the addition of custom data types, or other carriers that allow for the inclusion of the copy protection information.

At step 410, the copy protection information is encoded to produce an encoded copy protection indication. As stated earlier, encoding the copy protection indication may include constructing a simple message that relays sufficient detail for regeneration of the copy protection information, or may include generation of a continuous data stream that details the variations in the copy protection information included in the video signal. For example, in the Macrovision™ copy protection standard, there are different standardized types of copy protection that may be included in the video signal. As such, the detection circuit could detect the particular type that has been included and simply relay this type information to any reconstruction circuitry. In other embodiments, the copy protection information may vary significantly across receipt of the video signal such that continuous monitoring and updating of the type of copy protection included in a regenerated signal is necessary.

At step 412, the compressed video data stream and the encoded copy protection indication are combined to produce an enhanced video data stream. At step 414, the enhanced video data stream is stored in memory. Once again, memory includes any type of storage media that allows for storage of the digital information included in the enhanced video data stream.

In order to ensure that unauthorized use of the stored enhanced video data stream does not take place, the storage performed at step 414 is preferably accomplished as illustrated in step 416 such that the storage is performed in a proprietary format. This may include storing the enhanced video data stream in an encrypted format, or in a format that is not recognizable to unauthorized stream readers. This ensures that when the memory is accessible by other entities within the overall video system, the data in the enhanced video data stream can not be accessed by unauthorized stream readers, or other devices that might defeat the copy protection included in the original video stream.

At step 418, at least a portion of the enhanced video data stream is retrieved from memory to produce a retrieved enhanced video data stream. At step 420, the retrieved enhanced video data stream is separated into the component portions which were merged at step 412 to generate the enhanced video data stream. Finally, at step 422, the video signal is reconstructed from the component portions such that the copy protection included in the original video signal is included in the reconstructed video signal.

The method and apparatus described herein allow for the time shifting and recording features of modern set top boxes and computers to be utilized in conjunction with the features included in VBI data streams. Support is also provided for copy protection information often included in video signals to prevent unauthorized use of the information included in the video signals.

It should be understood that the implementation of other variations and modifications of the invention in its various aspects should be apparent to those of ordinary skill in the art, and that the invention is not limited to the specific embodiments described. It is therefore contemplated to cover by the present invention any and all modifications, variations, or equivalence that fall within the spirit and scope of the basic underlying principles disclosed and claimed herein.

What is claimed is:

1. A video compression circuit, comprising:
   a video decoding block that receives an analog video signal and digitizes the analog video signal prior to separating vertical blanking interval data from video data in the digital video signal to form a video data stream and a vertical blanking interval data stream;
   a video encoding block operably coupled to the video decoding block, wherein the video encoding block encodes the video data stream to produce a compressed video data stream;
   a vertical blanking interval encoding block operably coupled to the video decoding block, wherein the vertical blanking interval encoding block isolates a selected vertical blanking interval data type from the vertical blanking interval data stream to produce a selected vertical blanking interval data type stream; and
   a video combination block operably coupled to the video encoding block and the vertical blanking interval encoding block, wherein the video combination block combines the compressed video data stream with the selected vertical blanking interval data type stream to produce an enhanced video data stream.

2. The circuit of claim 1 further comprises:
   an audio decoding block that receives an audio signal, wherein the audio decoding block produces a digital audio signal; and
   an audio encoding block operably coupled to the audio decoding block and the video combination block, wherein the audio encoding block encodes the digital audio signal to produce an encoded audio stream, wherein the video combination block combines the encoded audio signal, the compressed video data stream, and the selected vertical blanking interval data type stream to produce the enhanced video stream.

3. The circuit of claim 1, wherein the selected vertical blanking interval data type stream includes a data type taken from a set of data types that includes; closed caption, parental control, advanced television enhancement forum, Teletext, and Intercast.

4. The circuit of claim 1, wherein the video decoder detects copy protection information included in the video signal, wherein the video combination block includes a copy protection indication in the enhanced video stream based on detected copy protection information.

5. The circuit of claim 4 further comprises a copy protection encoding block operably coupled to the video decoder and the video combination block, wherein the copy protection encoding block encodes detected copy protection information to produce the copy protection indication that is included in the enhanced video stream.

6. The circuit of claim 1 further comprises:
   a memory;
   a stream write operably coupled to the video combination block and the memory, wherein the stream writer stores the enhanced video data stream in the memory;
   a stream reader operably coupled to the memory, wherein the stream reader retrieves at least a portion of the enhanced video data stream from the memory to produce a retrieved enhanced video data stream; and
   a stream splitter operably coupled to the stream reader, wherein the stream splitter divides the retrieved enhanced video data stream to produce the compressed video data stream and the selected vertical blanking interval data type stream.

7. The circuit of claim 6, wherein the selected vertical blanking interval data type stream includes a closed caption stream, and wherein the circuit further comprises a closed caption database operably coupled to the memory, wherein the closed caption database stores time-stamped closed caption information, wherein portions of the enhanced video data stream are selectively accessed based on the time-stamped closed caption information.

8. The circuit of claim 1, wherein the compressed video data stream is an MPEG video data stream.

9. The circuit of claim 1, wherein the vertical blanking interval encoding block isolates a plurality of vertical blanking interval data types from the vertical blanking interval data stream to produce a plurality of vertical blanking interval data type streams, and wherein the circuit further comprises a register operably coupled to the video combination block, wherein the register determines which of the plurality of vertical blanking interval data type streams are combined with the video data stream to produce the enhanced video data stream.

10. A method for video compression, comprising:

receiving an analog video signal;

digitizing the analog video signal prior to separating vertical blanking interval data from video data in the digital video signal to produce a video data stream and a vertical blanking interval data stream;

encoding the video data stream to produce a compressed video data stream;

isolating a selected vertical blanking interval data type from the vertical blanking interval data stream to produce a selected vertical blanking interval data type stream; and combining the compressed video data stream and the selected vertical blanking interval data type stream to produce an enhanced video data stream.

11. The method of claim 10 further comprises:

receiving an audio signal;

digitizing the audio signal to produce a digital audio signal;

encoding the digital audio signal to produce an encoded audio stream; and wherein combining the compressed video data stream and the selected vertical blanking interval data stream further comprises combining the compressed video data stream, the selected vertical blanking interval data type stream, and the encoded audio stream to produce the enhanced video data stream.

12. The method of claim 10, wherein the selected vertical blanking interval data type is selected from a set of vertical blanking interval data types that includes: closed caption, parental control, advanced television enhancement forum, Teletext, and Intercast.

13. The method of claim 10 further comprises:

detecting copy protection included in the video signal; and including an indication of the copy protection in the enhanced video data stream.

14. The method of claim 10 further comprises:

storing the enhanced video data stream in memory;

retrieving at least a portion of the enhanced video data stream from memory to produce a retrieved enhanced video data stream; and separating the retrieved enhanced video data stream to produce the compressed video data stream and the selected vertical blanking interval data type stream.

15. The method of claim 14, wherein the selected vertical blanking interval data type stream includes closed caption data, and wherein the method further comprises selectively accessing portions of the enhanced video data stream as stored in memory based on time stamped closed caption data.

16. The method of claim 10, wherein encoding the video data stream further comprises encoding the video data stream to produce an MPEG format compressed video data stream.

17. A video compression circuit, comprising:

a video decoding block that receives a video signal, detects copy protection in the video signal, and produces a video data stream and copy protection information from the video signal;

a video encoding block operably coupled to the video decoding block, wherein the video encoding block encodes the video data stream to produce a compressed video data stream;

a copy protection encoding block operably coupled to the video decoding block, wherein the copy protection encoding block encodes the copy protection information to produce an encoded copy protection indication;

a video combination block operably coupled to the video encoding block and the copy protection encoding block, wherein the video combination block combines the compressed video data stream with the encoded copy protection indication to produce an enhanced video data stream;

a memory;

a stream writer operably coupled to the video combination block and the memory, wherein the stream write stores the enhanced video data stream in the memory in a predetermined storage format;

a stream reader operably coupled to the memory, wherein the stream reader retrieves at least a portion of the enhanced video data stream in the predetermined storage format from the memory to produce a retrieved enhanced video data stream;

a stream splitter operably coupled to the stream reader, wherein the stream splitter divides the retrieved enhanced video data stream to produce the compressed video data stream and the encoded copy protection indication; and a video signal reconstruction block operably coupled to the stream splitter, wherein the video signal reconstruction block reconstructs a reconstructed video signal from the compressed video data stream and the encoded copy protection indication, wherein the reconstructed video signal includes the copy protection information included in the video signal received by the video decoding block.

18. The circuit of claim 17 further comprises:

an audio decoding block that receives an audio signal, wherein the audio decoding block produces a digital audio signal; and an audio encoding block operably coupled to the audio decoding block and the video combination block, wherein the audio encoding block encodes the digital audio signal to produce an encoded audio stream, wherein the video combination block combines the encoded audio signal, the compressed video data stream, and the encoded copy protection indication to produce the enhanced video stream.

19. The circuit of claim 17 further comprises a vertical blanking interval encoding block operably coupled to the video decoding block and the video combination block, wherein the video decoding block separates vertical blanking interval data from the video signal to produce a vertical blanking interval data stream, wherein the vertical blanking interval encoding block isolates a selected vertical blanking interval data type from the vertical blanking interval data stream to produce a selected vertical blanking interval data type stream, wherein the video combination block combines the compressed video data stream, the encoded copy protection indication, and the selected vertical blanking interval data type stream to produce the enhanced video stream.

20. The circuit of claim 9 wherein selected vertical blanking interval data type stream includes a data type taken from a set of data types that includes: closed caption, parental control, advanced television enhancement forum, Teletext, and Intercast.

21. A method for video compression, comprising:

receiving a video signal;

detecting copy protection in the video signal;

producing a video data stream and copy protection information from the video signal;
encoding the video data stream to produce a compressed video data stream;
encoding the copy protection information to produce an encoded copy protection indication;
combining the compressed video data stream and the encoded copy protection indication to produce an enhanced video data stream;
storing the enhanced video data stream in memory;
retrieving the enhanced video data stream from memory to produce a retrieved enhanced video data stream;
separating the retrieved enhanced video data stream to produce the compressed video data stream and the encoded copy protection indication; and
reconstructing a reconstructed video signal from the compressed video data stream and the encoded copy protection information, wherein the reconstructed video signal includes the copy protection information included in the video signal.

22. A method for video compression, comprising:
receiving a video signal;
detecting copy protection in the video signal;
producing a video data stream and copy protection information from the video signal;
encoding the video data stream to produce a compressed video data stream;
encoding the copy protection information to produce an encoded copy protection indication;
combining the compressed video data stream and the encoded copy protection indication to produce an enhanced video data stream; and
storing the enhanced video data stream further comprises storing the enhanced video data stream in memory in a proprietary format.

23. A video compression processor, comprising:
a processing module; and
memory operably coupled to the processing module, wherein the memory stores operating instructions that, when executed by the processing module, cause the processing module to perform functions that include:
detecting copy protection in a received video signal;
producing a video data stream and copy protection information from the received video signal;
encoding the video data stream to produce a compressed video data stream;
encoding the copy protection information to produce an encoded copy protection indication;
combining the compressed video data stream and the encoded copy protection indication to produce an enhanced video data stream; and
storing the enhanced video data stream in memory in a proprietary format.

24. The processor of claim 23, wherein the operating instructions stored by the memory include operating instructions such that the functions performed by the processing module further include:
storing the enhanced video data stream in memory in a proprietary format;
retrieving the enhanced video data stream from memory to produce a retrieved enhanced video data stream;
separating the retrieved enhanced video data stream to produce the compressed video data stream and the encoded copy protection indication; and
reconstructing a reconstructed video signal from the compressed video data stream and the encoded copy protection information, wherein the reconstructed video signal includes the copy protection information included in the video signal.

* * * * *